(12) United States Patent
Lundberg et al.

(10) Patent No.: US 7,996,328 B1
(45) Date of Patent: Aug. 9, 2011

(54) ELECTRONIC SHIPPING NOTIFICATIONS

(75) Inventors: Eric Lundberg, Lebanon, PA (US); Pengyue Yang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 109 days.

(21) Appl. No.: 11/627,257

(22) Filed: Jan. 25, 2007

(51) Int. Cl.
*G06Q 30/00* (2006.01)
(52) U.S. Cl. ...................................................... 705/333
(58) Field of Classification Search ............... 705/1, 333
See application file for complete search history.

(56) References Cited

U.S. PATENT DOCUMENTS

| | | | |
|---|---|---|---|
| 6,085,170 A * | 7/2000 | Tsukuda | 705/26 |
| 2002/0013774 A1 * | 1/2002 | Morimoto | 705/80 |
| 2002/0032573 A1 * | 3/2002 | Williams et al. | 705/1 |
| 2002/0107772 A1 | 8/2002 | Jain et al. | |
| 2003/0065625 A1 * | 4/2003 | Rosenbaum et al. | 705/75 |
| 2003/0093388 A1 * | 5/2003 | Albright | 705/400 |
| 2005/0251330 A1 * | 11/2005 | Waterhouse et al. | 701/204 |

FOREIGN PATENT DOCUMENTS

WO        WO 02/29508 A2        4/2002

OTHER PUBLICATIONS

"UPS Goes Wireless with SMS Tracking" UPS Philippines Press Release. http://www.ups.com/content/ph/en/about/news/press_releases/1108b2006.html.*

"Press Release—DHL Customers Get a Better View of Their Shipments" DHL, Nov. 13, 2006, [online], [retrieved on Jun. 21, 2007] Retrieved from the Internet <URL:http://dhl-usa.com/about/pr/PRDetail.asp?nav=PressRoom/PressRelease&year=200...>.

"quikSlip for BV Commerce 2004" Shareware Connection, 2004, [online], [retrieved on Jun. 21, 2007] Retrieved from the Internet <URL:http://www.sharewareconnection.com/quikslip-for-bv-commerce-2004.htm>.

"Shop-Script shopping cart software features," Shop-Script Ecommerce PHP shopping cart software, [online], [retrieved on Jun. 21, 2007] Retrieved from the Internet <URL:http://www.shop-script.com/features.php>.

"UPS Goes Wireless With SMS Tracking," UPS, Nov. 2, 2006, [online], [retrieved on Jun. 21, 2007] Retrieved from the Internet <URL:http://www.ups.com/content/ph/en/aboutnews/press_release/1108b2006.html>.

* cited by examiner

*Primary Examiner* — John W Hayes
*Assistant Examiner* — Allen J Jung
(74) *Attorney, Agent, or Firm* — Fenwick & West LLP

(57) ABSTRACT

A broker facilitates customer purchases from merchants. Shippers ship shipments containing the purchases from merchants to the customers. A shipper identifies a shipment using a shipment identifier. The broker uses the shipment identifier to obtain the status information for the shipment from the shipper. The broker analyzes the status information in combination with other information to calculate an estimate of the time that the shipment will arrive at the customer's address. The broker sends an electronic message, such as an email or text message, to the customer prior to the estimated shipment arrival time to inform the customer of the impending arrival. The customer can thus arrange for someone to be at the shipping address to receive the shipment at the estimated arrival time.

18 Claims, 6 Drawing Sheets

ELECTRONIC SHIPPING NOTIFICATIONS

BACKGROUND OF THE INVENTION

1. Field of the Invention

This invention pertains in general to electronic commerce, and more specifically to electronic notifications related to shipping of physical items.

2. Description of the Related Art

Electronic commerce on the Internet has become commonplace. There are many merchants offering items via web sites on the Internet, and there are an even greater number of customers who purchase the items. In many cases, the customers purchase physical items, such as electronics, foodstuffs, compact disks, DVDs, and books. The merchants deliver the items to the customers using shipping companies such as the United States Postal Service (USPS), Federal Express, United Parcel Service (UPS), etc. These shippers deliver shipments to the addresses specified by the customers, usually either the customers' home or work addresses.

Many shippers require the customer or another person to be present in order to receive the shipment. Therefore, the customer must ensure that someone is at the specified address at the time of delivery. To assist the customers in their planning, the shippers provide the customers with tracking numbers for the shipments. The customers provide the tracking numbers to web sites and/or interactive voice response (IVR) telephone systems operated by the shippers and/or merchants in order to gain status information about the shipments, such as the estimated delivery dates. A customer then ensures that someone is at the address on the estimated delivery date.

One drawback to the system described above is that the status information is often not very precise. The status information might include an overly-conservative, and incorrect, delivery date prediction. Moreover, even if the delivery date prediction is correct, the status information does not provide the likely time of delivery. As a result, the person receiving the shipment must plan to remain at the delivery address for the entire day, or even for multiple days, or risk missing the delivery. This waiting can be extremely inconvenient for people who work or have other obligations that make it difficult to remain at the shipping address. One possible solution to this problem is to ship the item to the customer's work or to another address where someone is usually available to accept the shipment. However, this solution is not ideal for items that are difficult to transport.

SUMMARY OF THE INVENTION

Methods, systems, and computer program products consistent with the principles of the invention address this and other needs by providing customers with estimates of the times of arrival of shipments.

In accordance with an aspect of the invention, a method provides notification of impending delivery of a shipment shipped by a shipper to a shipping address specified by a customer. The method includes interfacing with a shipper computer system provided by the shipper to determine status information for the shipment, calculating an estimated delivery time for the shipment responsive to the status information, and notifying the customer via an electronic message of an impending arrival of the shipment at the shipping address responsive to the estimated delivery time.

According to another aspect, a system for providing notification of impending delivery of a shipment shipped by a shipper to a shipping address specified by a customer. The system includes a shipper interface module for interfacing with a shipper computer system provided by the shipper to determine status information for the shipment. Further, an embodiment of the system includes an arrival calculation module for calculating an estimated delivery time for the shipment responsive to the status information and an arrival notification module for notifying the customer via an electronic message of an impending arrival of the shipment at the shipping address responsive to the estimated delivery time.

According to yet another aspect, a computer program product includes a computer-readable medium having computer program code tangibly embodied thereon for predicting a time of delivery of a shipment containing an item ordered by a customer in an electronic commerce system. The computer program code includes code for establishing a customer address to which a shipper is to deliver the shipment, analyzing historical delivery information for the shipper, the historical delivery information describing the shipper's times of delivery to a plurality of addresses, and predicting the time of delivery of the shipment to the customer address responsive to the analysis of the historical delivery information.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

I. Overview

Figure 1:
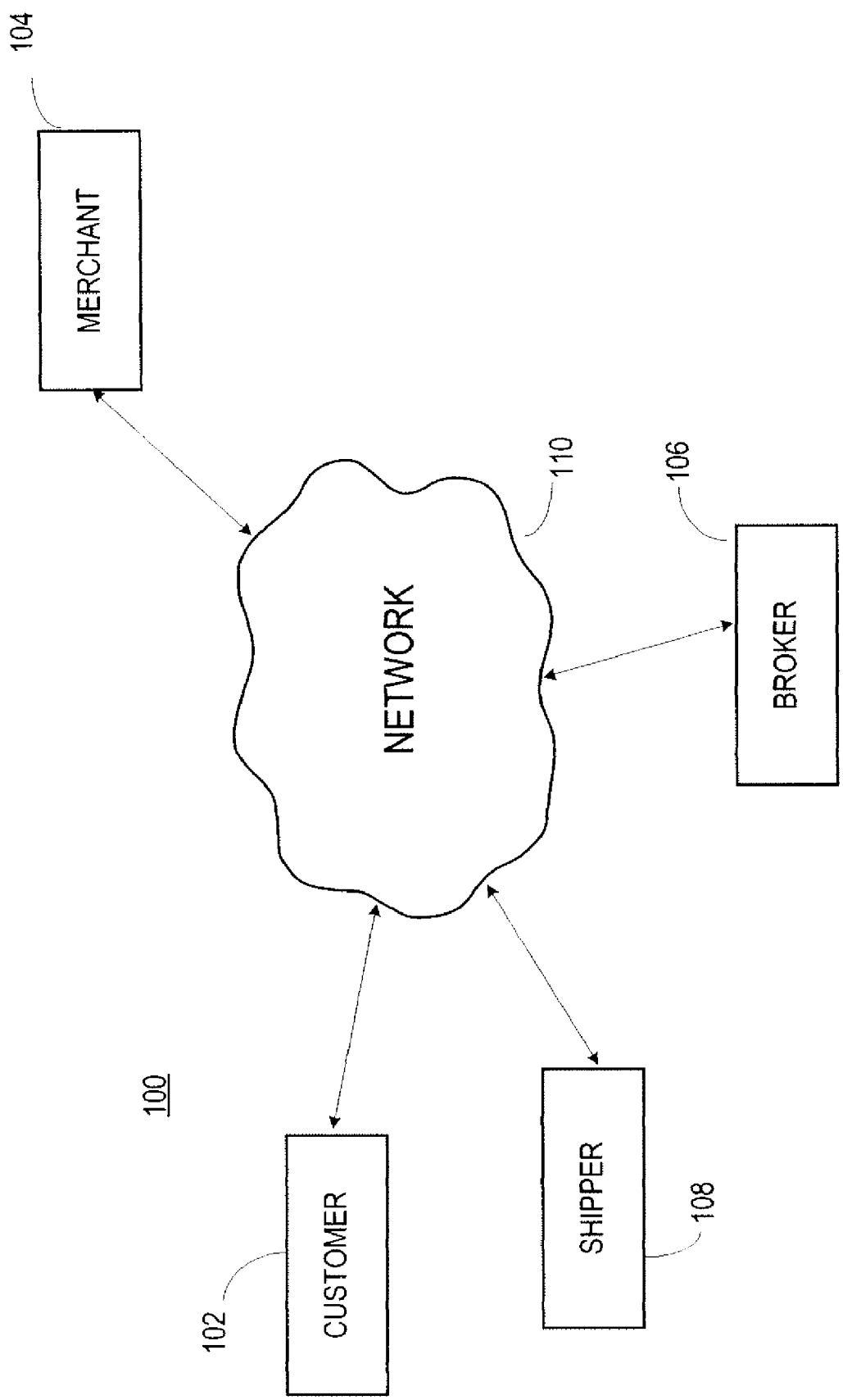
FIG. 1 is a high-level block diagram of a computing environment according to one embodiment of the present invention.

FIG. 1 is a high-level block diagram of a computing environment 100 according to one embodiment of the present invention. FIG. 1 illustrates a customer 102, a merchant 104, and broker 106, and a shipper 108 connected by a network 110. The customer 102 in this embodiment represents an entity that obtains items via the network 110 through purchases or other types of transactions. The customer 102 is sometimes referred to as the "buyer" and the transaction is sometimes referred to as a "sale" or "purchase." As used herein, these terms also refer to other types of transactions, regardless of whether the customer is technically a "buyer" or the transaction is technically a "purchase." End-users acting as customers 102 can include end-users purchasing items for their own use or as gifts, and/or end-users purchasing items for the use of a company or other enterprise with which the end-users are associated.

In one embodiment, the customer 102 includes a computer system utilized by an end-user to communicate with other computers on the network 110 in order to effect a purchase. The computer system, for example, can be a personal computer executing a web browser such as MICROSOFT INTERNET EXPLORER® that allows the end-user to retrieve and display content from web servers and other computer systems on the network 110. In other embodiments, the customer 102 includes a network-capable device other than a computer system, such as a personal digital assistant (PDA), a mobile phone, a pager, a television "set-top box" etc. The computer system need not include any special functionality in order to receive the electronic shipping notifications described herein. Although FIG. 1 illustrates only one customer 102, embodiments of the present invention can have thousands or millions of customers participating in the electronic commerce system described herein. Only one customer 102 is illustrated in order to simplify and clarify the present description.

Similarly, the merchant 104 represents an entity that sells items on the network 110 or makes items available through other types of transactions. The merchant 104 offering an item to the customer 102 is sometimes referred to as the "seller" and the transaction is sometimes referred to as a "sale" or "purchase." As used herein, these terms also refer to other types of transactions, regardless of whether the merchant is technically a "seller" or the transaction is technically a "sale." Although FIG. 1 illustrates only a single merchant 104, embodiments of the present invention can have many merchants participating in the electronic commerce system. Only one merchant 104 is illustrated in order to simplify and clarify the present description.

In one embodiment, the merchant 104 includes a computer system acting as a web server that is utilized to offer the items to potential customers 102. The merchant 104 is said to be "online," meaning that the merchant provides a presence on the network 110. The items offered by the merchant 104 can include tangible items such as books, CDs, DVDs, digital cameras and other types of electronic goods, etc. The items offered by the merchant 104 can also include intangible items such as services and electronic content such as web pages, downloadable files, streaming media, etc.

In one embodiment, the merchant 104 allows customers 102 to shop using a "shopping cart" metaphor. A customer 102 places an item in a virtual shopping cart. When the customer desires to purchase the items in the shopping cart, the customer chooses a "purchase" option or equivalent on the merchant's web site. The merchant 104 encodes information describing the transaction in the virtual shopping cart. This information identifies the item, the quantity of the item being purchased, and the cost of the item. In addition, the information in the cart includes data about the transaction, including data describing shipping options and taxes to collect.

The broker 106 represents an entity that serves as an intermediary for the transaction between the customer 102 and the merchant 104. In one embodiment, the broker 106 operates a system that functions as a centralized place that the customers 102 can use to pay for items offered by the merchants 104. Thus, the customers 102 can patronize multiple merchants 104 while providing their payment information to only the broker 106. Although FIG. 1 illustrates only a single broker 106, embodiments of the present invention can have multiple brokers participating in the electronic commerce system. In one embodiment, the broker 106 is said to be "remote" from the customer 102 and/or merchant 104. "Remote" in this context means that the broker is logically separate from the customer and/or merchant, and does not necessarily refer to a physical distance between the entities. In some embodiments, the broker 106 is absent and the functionality ascribed to the broker herein is performed by the merchant 104, shipper 108, and/or another entity on the network 110.

In one embodiment, the broker 106 is within a different "domain" than the customer 102 and/or merchant 104. As used here, the term "domain" generally refers to a sphere of influence. A broker 106 and merchant 104 are in different domains when they are independent of each other and lack a shared point of control. There is not necessarily a relationship between the domain in which a broker 106 and/or merchant 104 reside and the domain names utilized by those entities on the network 110, although the use of different domain names may constitute evidence that the broker and merchant are independent and thus in different domains. In some embodiments, the broker 106 is within the same domain as some customers 102 and/or merchants 104, and in a different domain than other customers and/or merchants.

In one embodiment, the broker 106 receives a customer's shopping cart from the merchant 104 and/or the customer 102. The broker 106 conducts a transaction with the customer 102 to enable the customer to purchase the items in the shopping cart. During the transaction, the broker 106 provides one or more web pages to the customer 102 that allow the broker to learn information about the customer 102 and transaction, such as the customer's shipping address, payment information, and/or a coupon code. In one embodiment, the broker 106 provides the customer 102 with only a single web page, and the broker dynamically updates portions of the web page as the customer selects the options for the transaction. For example, the broker 106 updates the web page in real-time to display actual shipping costs when the user provides a shipping address and/or selects a shipping method.

The shipper 108 interacts with the merchant 104 and/or broker 106 to ship purchased items to the customers 102. In one embodiment, the shipper 108 is a major package delivery service such as the United States Postal Service (USPS), Federal Express, United Parcel Service (UPS), or DHL International. In other embodiments, the shipper 108 is a different or smaller delivery service, a common carrier, a shipping service provided by the merchant 104 or broker 106, and/or another shipping agency.

In one embodiment, the shipper 108 obtains information about the shipment from the merchant 104 and/or broker 106, picks up a shipment containing a purchased item from the merchant 104, and delivers the shipment to the customer's specified shipping address. The shipper 108 associates a shipment identifier (e.g., a tracking number) with the shipment and provides the shipment identifier to the merchant 104 and/or broker 106. In addition, the shipper 108 provides a network interface that the merchant 104, broker 106, and/or customer 102 can use to provide the shipment identifier and access status information for the shipment. The interface can include, for example, a web site, a web services-based application programming interface (API), and/or another electronic interface enabling network-based exchanges of information. In some embodiments, the shipper 108 provides additional and/or different interfaces, such as an interactive voice response (IVR) telephone interface. The status information describes aspects of the shipment including, for example, the date that the shipment was picked up from the merchant 104, the estimated date that the shipment will be delivered to the customer 102, and the current location of the shipment.

In one embodiment, the broker 106 uses the shipment identifier to access the shipper's interface and obtain the status information for the shipment. The broker analyzes the status information to calculate a precise estimate of the time that the shipment will arrive at the customer's address. The broker 106 sends an electronic message, such as an email or text message, to the customer prior to the estimated shipment arrival time to inform the customer of the impending arrival. The customer 102 can thus arrange for someone to be at the shipping address to receive the shipment at the estimated arrival time.

The network 110 represents communication pathways between the customer 102, merchant 104, broker 106, and shipper 108. In one embodiment, the network 110 is the Internet. The network 110 can also utilize dedicated or private communications links that are not necessarily part of the Internet, such as mobile phone communications networks. In one embodiment, the network 110 uses standard communications technologies and/or protocols. Thus, the network 110 can include links using technologies such as Ethernet, 802.11, integrated services digital network (ISDN), digital subscriber line (DSL), asynchronous transfer mode (ATM), etc. Similarly, the networking protocols used on the network 110 can include the transmission control protocol/Internet protocol (TCP/IP), the hypertext transport protocol (HTTP), the simple mail transfer protocol (SMTP), the file transfer protocol (FTP), the short message service (SMS) protocol, etc. The data exchanged over the network 110 can be represented using technologies and/or formats including the hypertext markup language (HTML), the extensible markup language (XML), etc. In addition, all or some of links can be encrypted using conventional encryption technologies such as the secure sockets layer (SSL), HTTP over SSL (HTTPS), and/or virtual private networks (VPNs). In another embodiment, the entities can use custom and/or dedicated data communications technologies instead of, or in addition to, the ones described above.

II. System Architecture

Figure 2:
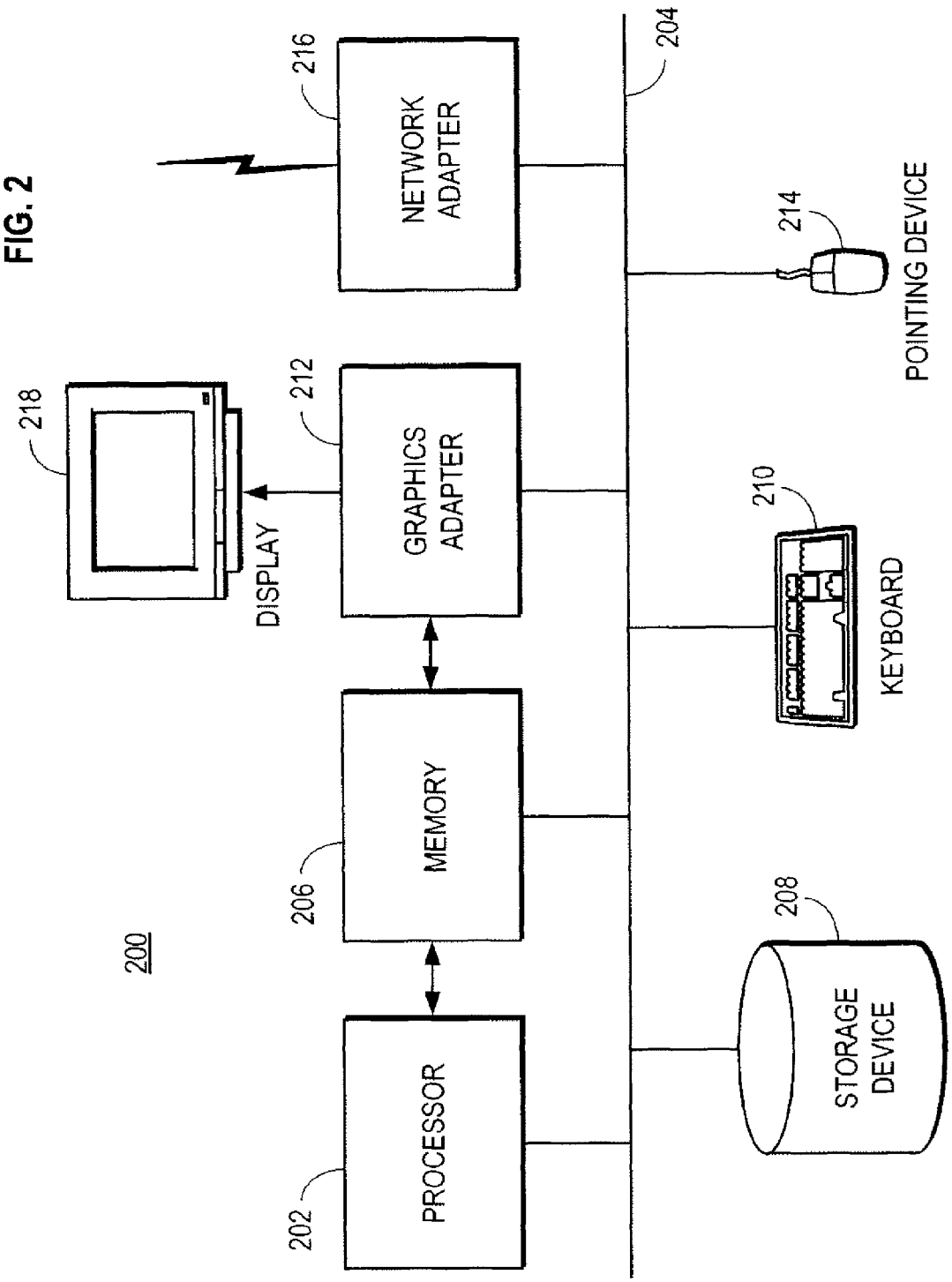
FIG. 2 is a high-level block diagram illustrating a functional view of a typical computer system for use as one of the entities illustrated in the environment of FIG. 1 according to one embodiment.

FIG. 2 is a high-level block diagram illustrating a functional view of a typical computer system 200 for use as one of the entities illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 110.

As is known in the art, the computer system 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computer systems 200 utilized by the entities of FIG. 1 can vary depending upon the embodiment and the processing power utilized by the entity. For example, the customer 102 typically requires less processing power than the merchant 104 and broker 106. Thus, the customer computer system can be a standard personal computer system or a mobile telephone. The merchant and broker computer systems, in contrast, may comprise more powerful computers and/or multiple computers working together to provide the functionality described herein.

Figure 3:
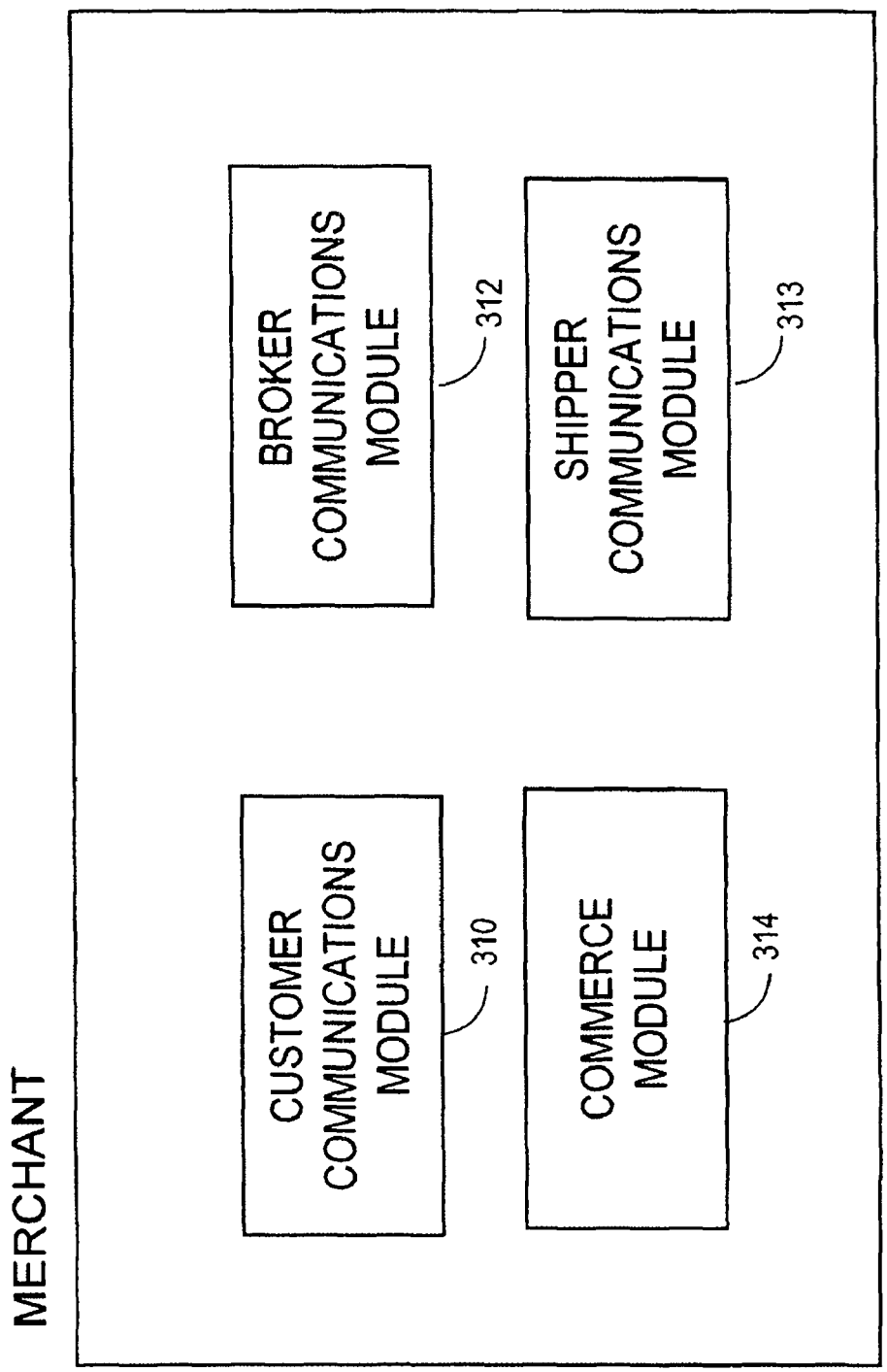
FIG. 3 is a high-level block diagram illustrating modules within a merchant according to one embodiment.

FIG. 3 is a high-level block diagram illustrating modules within a merchant 104 according to one embodiment. Those of skill in the art will recognize that other embodiments can have different and/or other modules than the ones described here, and that the functionalities can be distributed among the modules in a different manner.

A customer communications module 310 communicates with the customer 102 via the network 110. In one embodiment, the customer communications module 310 includes a web server that provides web pages to the customer 102 and receives end-user input sent over the network 110 by the customer's web browser. The customer communications module 310 thus allows a customer to navigate the merchant's web site.

In one embodiment, a broker communications module 312 communicates with the broker 106 via the network 110. In one embodiment, merchant-broker communications are conducted using the web services description language (WSDL). The broker communications module 312 uses WSDL to describe the services it provides and ascertain the services provided by the broker 106. The broker communications module 312 uses XML-based remote procedure calls (RPCs) to provide information to the broker 106 and receive information in return. In other embodiments, the broker communications module 312 communicates with the broker 106 using other techniques and/or protocols, such as via email messages, HTML web pages intended for review by human users, proprietary communications protocols, etc.

A shipper communications module 313 communicates with the shipper 108 via the network 110. In some embodiments, the shipper communications module 313 is functionally similar to the broker communications module 312 and uses WSDL or equivalent techniques to communicate with a shipper 108 via the shipper's API. In other embodiments, the shipper communications module 313 uses other techniques to communicate with the shipper 108.

A commerce module 314 operates in tandem with the customer communications module 310 and allows customers 102 to engage in electronic commerce with the merchant 104. In general, the commerce module 314 allows the merchant 104 to create and manage a catalog of items available for sale. A customer 102 can browse the catalog and indicate items that the customer 102 desires to purchase. In one embodiment, the commerce module 314 includes functionality from the open source osCommerce package. The commerce module 314 utilizes a shopping cart metaphor where items selected by the customer 102 are placed in a virtual shopping cart. The merchant 104 provides this shopping cart to the broker 106.

When this description refers to "placing" or "storing" an item in a cart, it should be understood that a virtual representation of the item is actually stored, and not the item itself. In one embodiment, this virtual representation includes information describing the item, including the name, price, and quantity of the item, a textual description of the item, a merchant identification (ID) that uniquely identifies the merchant 104, and/or private merchant data that might be opaque to entities other than the merchant 104. Further, in one embodiment the commerce module 314 places information in the shopping cart describing possible shipping methods and costs, anticipated shipping dates, and/or order processing times for given items. In one embodiment, the commerce module 314 digitally signs the shopping cart to prevent third parties from modifying it.

In one embodiment, the commerce module 314 encodes the shopping cart using XML. The broker 106 or another entity provides an XML schema definition (XSD) to the merchant 104 that describes how to encode the item information, tax information, and other information in the shopping cart. The merchant 104 creates the shopping cart according to the XSD.

In one embodiment, the commerce module 314 provides the customer 102 with one or more payment options at the time of checkout. One option references a payment system provided by the broker 106. The broker's payment system may be more desirable to a customer 102 when, for example, the merchant 104 is not well known to the customer. The broker 106 may be well known to the customer 102 and an entity to which the customer 102 is comfortable providing payment information. In one embodiment, the commerce module 314 provides a graphic, slogan, and/or other indicia that represents the broker 106 and is designed to convey a sense of trustworthiness to the customer 102.

When the customer selects the broker payment system, or at another time, the commerce module 314 uses the customer communications module 310 to provide the shopping cart to the customer 102 and direct the customer's web browser to send it to the broker 106. The commerce module 314 can perform this latter task, for example, by using a HTTP GET method that codes the shopping cart into a uniform resource locator (URL) that references the broker 106, and redirecting the customer's browser to the coded URL. In another example, the commerce module 314 uses a HTTP POST method that codes the shopping cart into the body of a request made from the customer's browser to the broker 106. In another embodiment, the commerce module 314 uses the broker communications module 412 to send the shopping cart directly to the broker 106.

Although this description refers to the collection of information created by the commerce module 314 as a "shopping cart," it will be understood that this phrase refers to a collection of information utilized to inform the broker 106 about the items selected by the customer 102. In one embodiment, for example, the commerce module 314 creates one or more sets of data describing items that the customer 102 desires to purchase, and provides the sets of data to the broker 106. The broker 106, in turn, stores the sets of data in one or more shopping carts it maintains on behalf of the customer 102. Thus, the merchant 104 provides the broker 106 with item descriptions rather than virtual shopping carts.

Figure 4:
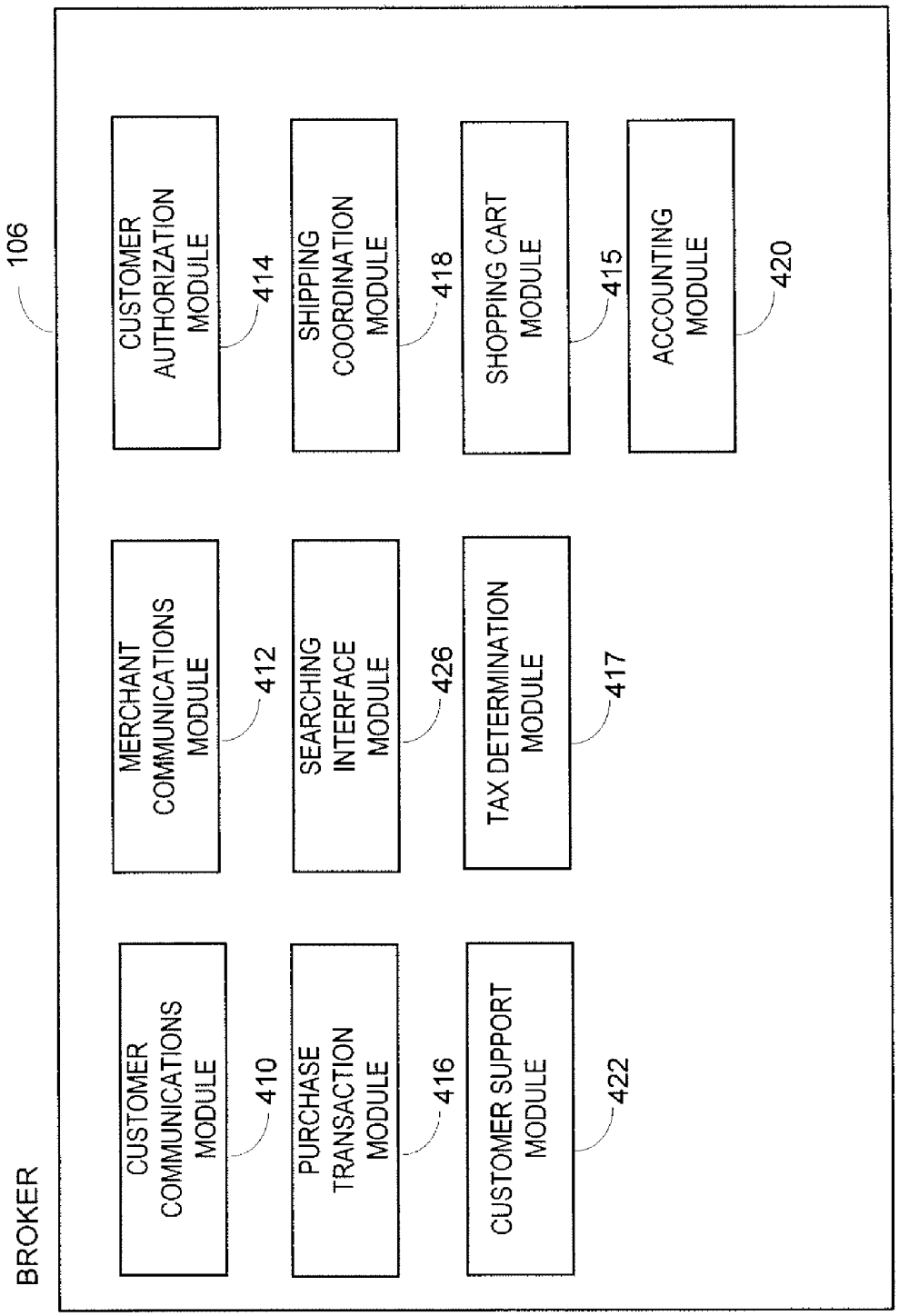
FIG. 4 is a high-level block diagram illustrating modules within the broker according to one embodiment.

FIG. 4 is a high-level block diagram illustrating modules within the broker 106 according to one embodiment. Those of skill in the art will recognize that other embodiments can have different and/or other modules than the ones described here, and that the functionalities can be distributed among the modules in a different manner.

The broker 106 includes a customer communications module 410 and a merchant communications module 412 for respectively communicating with the customer 102 and the merchant 104. In one embodiment, these modules are functionally similar to the customer 310 and broker 312 communications modules in the merchant 104.

A customer account module 414 maintains account information for customers seeking to use the broker 106 for purchases. In one embodiment, the customer account module 414 maintains an ID, password, and/or other information for each customer 102. The customer 102 supplies the correct information in order to identify and authenticate itself. In addition, the customer account module 414 maintains additional information about the customer, such as one or more shipping addresses utilized by the customer, payment information such as credit card numbers and billing addresses, and contact information such as a mailing address, email address, and/or mobile or regular telephone numbers. Further, an embodiment of the customer account module 414 also maintains other preferences selected by the customer, such as preferred shipping options, notification options, and the like.

The shopping cart module 415 maintains a set of shopping carts for the customers 102. The shopping cart module 415 receives the shopping carts from the merchant 104, from the customer 102, and/or from other sources. In one embodiment, the shopping cart module 415 maintains a single shopping cart for each customer 102. In other embodiments, the shopping cart module 415 maintains multiple shopping carts per customer 102. Depending upon the embodiment, the shopping carts store items from a single merchant or from multiple merchants. In one embodiment, the shopping cart module 415 deletes shopping carts that have not been accessed within a certain time period (e.g., 90 days).

A purchase transaction module 416 allows a customer 102 to purchase the items in a selected shopping cart. In one embodiment, the purchase transaction module 416 presents the customer 102 with web pages that describe the items in the cart and allow the customer to specify the methods of payment and shipping, along with any other details that are necessary and/or desired for the transaction. The purchase transaction module 416 uses the shipping address specified by the customer 102 and any shipping rules received from the merchant to calculate the rates for the customer's selected shipping method. In one embodiment, the purchase transaction module 416 stores the shipping costs as an "invisible" item in the shopping cart.

A shipping coordination module 418 interacts with the merchant 104 and/or shipper 108 to inform them of the purchase and coordinate shipping of the purchased item or items to the customer 102. In addition, the shipping coordination module 418 provides the customer 102 with notice of the impending arrival of the shipment. In one embodiment, the shipping coordination module 418 sends a message to the merchant 104 each time the broker 106 conducts a purchase transaction on behalf of the merchant. This message is sent using SMS or via another technique. The message, and/or subsequent messages, also provide the customer-indicated shipping address and shipping options to the merchant 102. The merchant coordinates with the shipper 108 and provides the shipment identifier to the shipping coordination module 418. In another embodiment, the shipping coordination module 418 directly interacts with the shipper 108 to obtain the shipment identifier and instruct the shipper to ship the shipment from the merchant 104 to the customer 102.

An accounting module 420 monitors the transactions that occur using the broker 106, invoices the customers 102, and credits the merchants 104 and/or shippers 108. In a typical case, the accounting module 420 charges the customer's credit card or other method of payment and credits the merchant's account for the amount of the purchase. In another embodiment, the accounting module 420 aggregates purchases made by the customers and then periodically credits each merchant for the value of the purchases made within the time period. In yet another embodiment, the accounting module 420 aggregates a customer's purchases within a given time period and then charges the customer's account once for the aggregate total of the purchases. This latter embodiment might be desirable where, for example, the customer 102 makes many small purchases.

A customer support module 422 allows customers 102 to request refunds and/or perform other customer-support related tasks. In one embodiment, the broker 106 provides a satisfaction guarantee and allows customers to obtain refunds on purchases with relative ease. This refund policy provides the customers 102 with added security and may make the customers more willing to purchase items from relatively unknown and/or untrustworthy merchants 104.

In one embodiment, a searching interface module 426 provides the customers 102 with access to content searching capabilities. These capabilities allow a customer 102 to provide the searching interface module 426 with a search query that specifies search parameters such as keywords, meta-data describing desired results, and/or other information and receive in return a list of content that at least partially satisfies the query. In one embodiment, the search query is generated implicitly based on actions performed by the customer 102 and/or other criteria. In one embodiment, the searching interface module 526 interfaces with a search engine provided by GOOGLE INC. of Mountain View, Calif. The search engine searches for content, shopping carts, and/or items provided by the merchants 104 that satisfy the queries. In one embodiment, the search engine also searches other domains.

Figure 5:
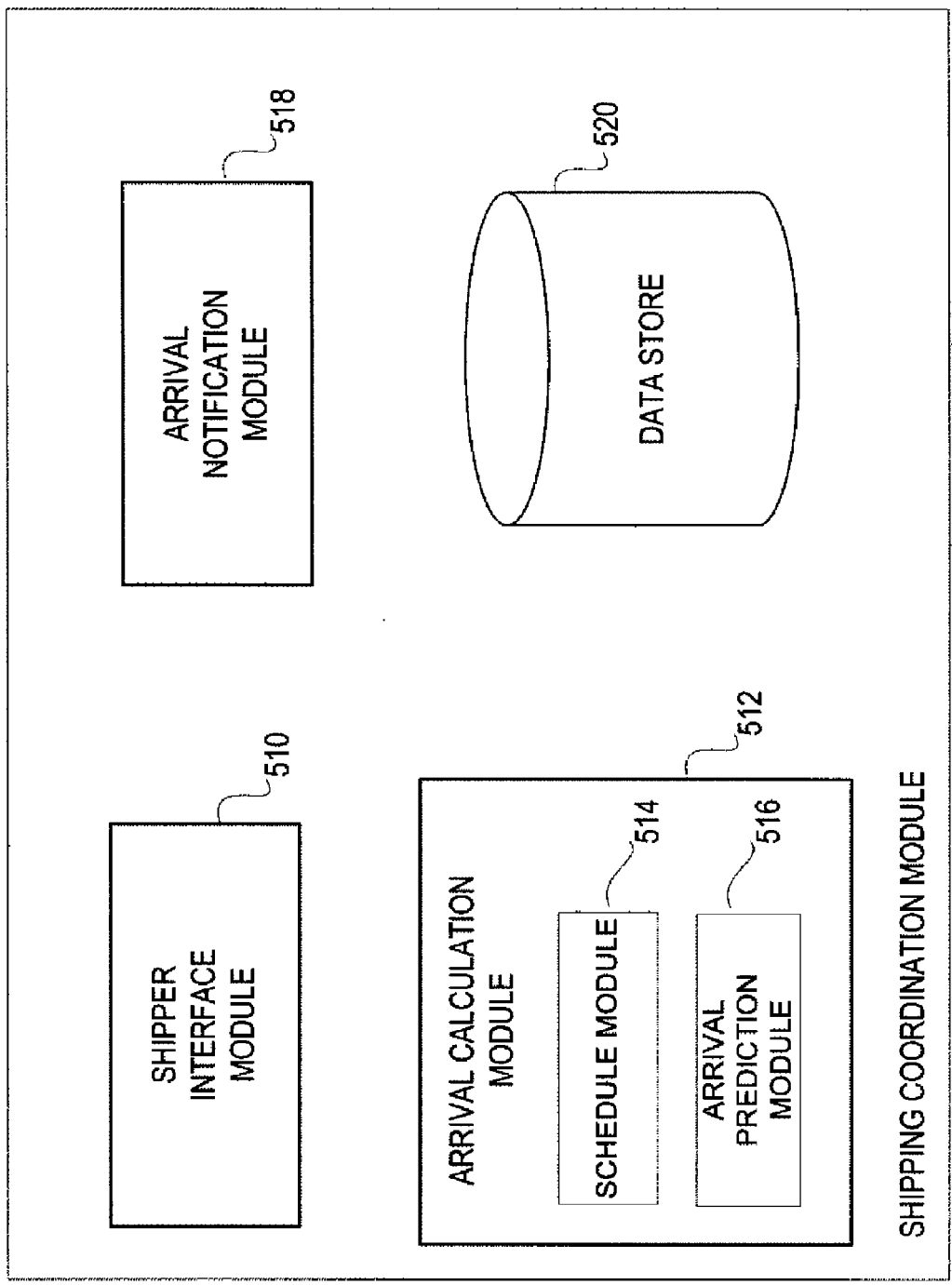
FIG. 5 is a block diagram illustrating modules within the shipping coordination module according to one embodiment.

FIG. 5 is a block diagram illustrating modules within the shipping coordination module 418 according to one embodiment. Those of skill in the art will recognize that other embodiments can have different and/or other modules than the ones described here, and that the functionalities can be distributed among the modules in a different manner.

A shipper interface module 510 communicates with the shipper 108 via the network 110. In one embodiment, the shipper interface module 510 is functionally similar to the shipper communications module 313 described above with respect to the merchant 104. Thus, an embodiment of the shipper interface module 510 uses WSDL to access a shipper's API and communicate with the shipper 108. In other embodiments, the shipper interface module 510 uses other techniques to communicate with the shipper 108.

As mentioned previously, in one embodiment the shipping coordination module 418 uses the shipper interface module 510 to instruct the shipper 108 to make a shipment from the merchant 104 to the customer-specified shipping address. In another embodiment, the merchant 104 coordinates the shipping. In either embodiment, the broker 106 obtains the shipment identifier utilized by the shipper 108 to identify the shipment. The shipper interface module 510 uses the shipment identifier to query the shipper 108 and receives status information for the shipment in return.

Different shippers 108 may provide different types of status information. Most shippers provide information including the shipping method (e.g., air or ground), the date that the shipment was picked up from the merchant 104, the estimated date that the shipment will be delivered to the customer 102, and the current location of the shipment. In addition, the status information often indicates other important events in the transit of the shipment, such as whether the shipment is subject to any exceptions that might delay delivery and whether the shipment has been placed "on the truck" for delivery. Once the shipment is delivered, the status information indicates the exact date and time of delivery. Further, some shippers 108 provide status information indicating the delivery address for the shipment, the number of individual packages forming the shipment, and/or the weight of the shipment.

An arrival calculation module 512 uses the status information to calculate a precise estimate of the time when a shipment will arrive at the customer's address. In one embodiment, a scheduler module 514 schedules queries of the shipper 108 to obtain status information utilized to calculate the arrival estimate time. For a given shipment, the scheduler module 514 schedules queries to the shipper to obtain the status information for the shipment. Sometimes the shipper 108 will not populate the status information until well after the shipment has been picked up from the merchant. Therefore, the status information for a shipment might not be populated when the shipping coordination module 418 first queries the shipper 108 for it. One embodiment of the scheduler module 514 schedules queries of the shipper 108 once a day for up to five days or until at least the "estimated delivery date" field is populated.

An embodiment of the scheduler module 514 also schedules a query of the shipper 108 on the day before the estimated delivery date indicated by a shipment's status information. Many shippers 108 conservatively estimate the delivery date and, in fact, frequently deliver the shipment a day earlier. If the status information shows that the shipment is not being delivered on the day before the estimated delivery date, an embodiment of the scheduler module 514 schedules another query for the estimated day of delivery. If the estimated delivery date slips or otherwise changes, the scheduler module 514 schedules another query of the shipper 108 based on the changed delivery date estimate. Some embodiments of the scheduler module 514 schedule queries based on other criteria, such as the shipping method. For example, the scheduler module 514 can schedule more frequent queries for shipments sent using an "overnight" service.

In one embodiment, the scheduler module 514 schedules the shipper queries for the morning in the local time zone of the delivery address, such as between 6:00 and 8:00 AM. A query at this time of day is likely to determine the status of the shipment before it is delivered. For example, in a typical scenario the shipper 108 will load a shipment onto a truck in the morning, and then deliver the shipment later in the day. Thus, an 8:00 AM status query will ascertain that the shipment is on the truck to be delivered, but not delivered as of yet.

An arrival prediction module 516 analyzes the status information for a shipment to predict a precise estimate of the time that the shipment will be delivered at the customer's shipping address. For purposes of this description, a "precise" delivery time estimate is one that is limited to a relatively brief time window. For example, a precise estimate can state that delivery will be made within a two hour window, or that the delivery will occur within a 15 minute window. An estimated delivery time window that encompasses an entire day, in contrast, is not precise. Likewise, an estimated delivery time window that not limited to particular times (e.g., "delivery will be in the morning") is not precise.

In one embodiment, the arrival prediction module 516 aggregates and analyzes historical status information for other shipments delivered by the shipper 108 in order to calculate a likely delivery time for a current shipment. In one embodiment, the arrival prediction module 516 analyzes delivery times for other shipments to addresses geographically proximate to the current shipping address. In some embodiments, the arrival predication module 516 analyzes other factors instead of, or in addition to, historical status information and/or geographic proximity to past shipping addresses in order to calculate the estimated delivery time. For example, the arrival predication module 516 can consider the distance from the shipper's depot to the shipping address, the day of the week, the date, current or predicted weather conditions, shipment weight, the delivery method, etc. Thus, the arrival prediction module 516 may determine that shipments delivered to a particular apartment building by a particular shipper 108 typically arrive at 11:45 AM. Similarly, the arrival predication module 516 may determine that 90% of shipments to a particular residential neighborhood are delivered between 9:30-10:30 AM.

An arrival notification module 518 sends notice of the precise estimate of the delivery time to the customer 102. In one embodiment, the arrival notification module 518 sends the notification upon determining that the shipment will arrive on the current day. For example, the module 518 sends the delivery time estimate to the customer 102 once the arrival calculation module 512 determines that the shipment is on the truck for delivery. In some embodiments, the arrival notification module 518 sends the notification to the customer 102 based on the estimated delivery time. For example, the arrival notification module 518 sends a notification of impending delivery 30 or 60 minutes before the estimated delivery time. In one embodiment, the customer can optionally specify when the notification is sent, e.g., whether notification is sent 15 minutes or 2 hours before the estimated delivery time. In addition, the arrival notification module 518 can send the delivery time estimate to the customer 102 at other times, such as when the status information first indicates an estimated delivery date, or when exception information indicates that the shipment will be delayed.

The arrival notification module 518 sends the delivery time estimate to the customer 102 using one or more of a variety of techniques. The arrival notification module 518 can send a text message to the customer's mobile phone or other text-messaging compatible device. The text messages can include, for example, Short Message Service (SMS) messages, Enhanced Messaging Service (EMS) messages, Multimedia Messaging Service (MMS) messages, and/or messages of other types. Likewise, the arrival notification module 518 can send email messages to a customer's mobile phone, computer, or other device capable of receiving email messages. Further, the arrival notification module 518 can place a telephone call to the customer 102 and play an audible message that states the delivery time estimate. Other embodiments of the notification module 518 use other techniques to notify the customer 102 of the estimated delivery time, such as by stating the estimated delivery time on a web page accessible to the customer 102.

A data store 520 stores data utilized by the shipping coordination module 418 during its operation. In some embodiments, the data store 520 is dedicated to the shipping coordination module 418 while in other embodiments the data store 520 stores other data utilized by the broker 106, such as data utilized by the modules illustrated in FIG. 4. The data in the data store 520 include, for example, shipment identifiers for shipments based on purchases made through the broker 106, status information retrieved from shippers 108, and shipping addresses, telephone numbers and notification preferences specified by the customers 102 and/or merchants 104. Likewise, an embodiment of the data store 520 stores historical delivery information and other data utilized by the arrival calculation module 512 to produce the precise delivery time estimates. Some embodiments store different and/or additional data in the data store 520. In one embodiment, the data store 520 includes one or more relational databases having tables storing information about the customers 102 and merchants 104.

III. Process/Example

Figure 6:
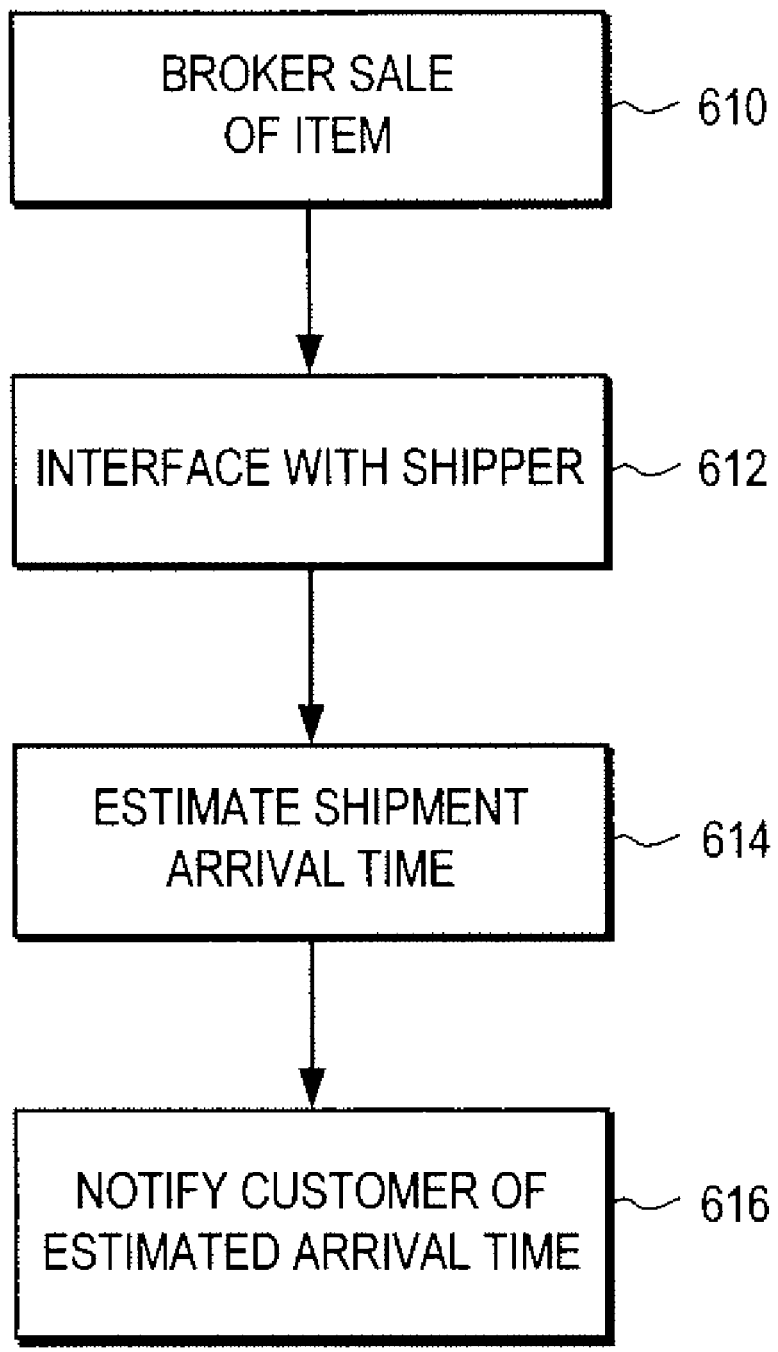
FIG. 6 is a flow chart illustrating steps performed by the broker 106 to provide an impending arrival notification to a customer 102 according to one embodiment.

FIG. 6 is a flow chart illustrating steps performed by the broker 106 to provide an impending arrival notification to a customer 102 according to one embodiment. Other embodiments perform different and/or additional steps. Likewise, some embodiments perform the steps in different orders. Those of skill in the art will recognize that real-world embodiments of the broker 106 handle multiple contemporaneous shipments to multiple customers, and thus simultaneously perform many instances of the steps illustrated in FIG. 6 with respect to the different shipments. Further, in some embodiments these steps are performed by entities other than the broker 106. For example, the merchant 104 and shipper 108 can also perform the some or all of the described steps (and utilize the described modules) to provide impending arrival notifications to customers 102.

In FIG. 6, the broker 106 brokers 610 a sale of an item from a merchant 104 to a customer 102. As part of this transaction, the customer 102 specifies a shipping address. In turn, the merchant 104 uses a shipper 108 to send a shipment containing the item to the customer 102. The shipper 108 associates a shipment identifier with the shipment, and provides the identifier to the broker 106 (either directly or via the merchant 104).

The broker 106 interfaces 612 with the shipper 108 via an API to obtain status information for the shipment. In one embodiment, the broker 106 schedules one or more queries to the shipper for the status information, and continues to query the shipper at regular intervals until the status information includes an estimated delivery date. Upon ascertaining the estimated delivery date, the broker 106 schedules another query to the shipper in advance of the estimated delivery date, e.g., a day before the estimated date. If the status information indicates that the shipment is not yet on the truck for delivery, the broker 106 schedules an additional query for the next day (and/or later the same day) and continues to query/schedule additional queries until the shipment is on the truck. In one embodiment, the queries are scheduled to occur in the early morning of the shipping address's local time zone because this is when the status information is likely to indicate that the shipment is on the truck for delivery, but not yet delivered.

In addition, the broker 106 estimates 614 the time at which the shipment will arrive at the customer's shipping address. In one embodiment, the estimate is calculated using historical information about other shipments delivered by the shipper, possibly in combination with other factors such as the distance from the shipper's depot to the shipping address, the date, shipment weight, and the like. In one embodiment, the estimate is an exact time while in other embodiments the estimate is a time window. In some embodiments the broker 106 estimates the shipment arrival time when the status information indicates that the shipment is on the truck for delivery. In other embodiments, the broker 106 generates the estimate at other times, such as when the status information first includes the estimated delivery date. Further, the broker 106 revises the estimated shipment arrival time in response to changes in the status information for the shipment. For example, if the status information indicates that an exception occurred, and/or that the estimated delivery date has slipped, the broker 106 recalculates the estimated shipment arrival time based on the changed status information.

The broker 106 notifies 616 the customer 102 of the estimated time of arrival for the shipment. As mentioned above, in some embodiments the broker 106 sends the notification at the time the estimate is determined or revised, while in other embodiments the broker 106 sends the notification based on the estimated delivery time (e.g., sending notification 30 minutes before the estimated delivery time). The broker 106 sends the notification to the customer 102 as a mobile-phone text message, an email message, a voice message delivered through an automated telephone system, etc. In addition, the broker 106 can deliver the notification by making it available on a web page accessible to the customer 102. This notification allows the customer 102 to ensure that someone is available to receive the shipment from the shipper 108.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed:

1. A method of providing notification of impending delivery of a shipment shipped by a shipper to a shipping address specified by a customer, comprising:
    periodically querying, by a broker computer system independent of the shipper and a merchant and which enabled the customer to purchase an item contained in the shipment from the merchant, a shipper computer system to obtain status information for the shipment with each query, wherein a periodic query of the shipment computer system comprises:
        requesting status information from the shipper computer system by providing a shipment identifier of the shipment to the shipper computer system; and
        receiving status information in response thereto;
    responsive to status information obtained with a periodic query indicating an estimated delivery date for the shipment, halting, by the broker computer system, the periodic queries and scheduling the restart of periodic queries of the shipper computer system a day prior to the estimated delivery date;
    restarting, by the broker computer system, periodic queries of the shipper computer system the day prior to the estimated delivery date to obtain updated status information with each query;
    responsive to updated status information obtained with a periodic query indicating that the shipment is out for delivery to the customer, halting, by the broker computer system, the periodic queries and calculating an estimated delivery time for the shipment based at least in part on the status information; and
    sending, by the broker computer system, an electronic message including the estimated delivery time to the customer.

2. The method of claim 1, wherein the electronic message notifies the customer of an impending arrival of the shipment at the shipping address responsive to the estimated delivery time.

3. The method of claim 1, wherein the estimated delivery time comprises a precise estimate of a time within a day when the shipment will arrive at the shipping address.

4. The method of claim 1, wherein the shipment identifier is provided to the shipper computer system via a computer network-based application programming interface (API).

5. The method of claim 1, wherein calculating an estimated delivery time for the shipment comprises:

analyzing historical status information for other shipments by the shipper; and
calculating the estimated delivery time based at least in part on the status information for the shipment and the historical status information.

6. The method of claim 5, wherein analyzing historical status information comprises:
    determining actual delivery times for previous shipments to locations geographically proximate to the shipping address specified by the customer.

7. The method of claim 1, wherein a local time zone for the shipping address is determined and at least one of the queries of the shipper computer system occurs in a morning of the local time zone.

8. The method of claim 1, wherein sending an electronic message comprises:
    sending a text message to a mobile phone number specified by the customer.

9. The method of claim 4, wherein the API is provided by a website of the shipment computer system.

10. The method of claim 1, wherein the shipment identifier is a tracking number.

11. A system for providing notification of impending delivery of a shipment shipped by a shipper to a shipping address specified by a customer, comprising:
    a computer processor; and
    a computer-readable storage medium storing computer program modules configured to execute on the computer processor, the computer program modules comprising:
    a shipper interface module for:
        periodically querying, by a broker independent of the shipper and a merchant and which enabled the customer to purchase an item contained in the shipment from the merchant, a shipper computer system to obtain status information for the shipment with each query, wherein a periodic query of the shipment computer system comprises:
            requesting status information from the shipper computer system by providing a shipment identifier of the shipment to the shipper computer system; and
            receiving status information in response thereto;
        responsive to status information obtained with a periodic query indicating an estimated delivery date for the shipment, halting, by the broker, the periodic queries and scheduling the restart of periodic queries of the shipper computer system a day prior to the estimated delivery date;
        restarting, by the broker, periodic queries of the shipper computer system the day prior to the estimated delivery date to obtain updated status information with each query;
    an arrival calculation module for, responsive to updated status information obtained with a periodic query indicating that the shipment is out for delivery to the customer, halting, by the broker, the periodic queries and calculating an estimated delivery time for the shipment based at least in part on the status information; and
    an arrival notification module for sending, by the broker, an electronic message including the estimated delivery time to the customer.

12. The system of claim 11, wherein the electronic message notifies the customer of an impending arrival of the shipment at the shipping address responsive to the estimated delivery time.

13. The system of claim 11, wherein the estimated delivery time comprises a precise estimate of a time within a day when the shipment will arrive at the shipping address.

14. The system of claim 11, wherein the shipment identifier is provided to the shipper computer system via a computer network-based application programming interface (API).

15. The system of claim 11, wherein the arrival calculation module comprises:
   an arrival prediction module for analyzing historical status information for other shipments by the shipper and calculating the estimated delivery time based at least in part on the status information for the shipment and the historical status information.

16. The system of claim 15, wherein the arrival prediction module is further adapted to determine actual delivery times for previous shipments to locations geographically proximate to the shipping address specified by the customer.

17. The system of claim 11, wherein a local time zone for the shipping address is determined and at least one of the queries of the shipper computer system occurs in a morning of the local time zone.

18. The system of claim 11, wherein the electronic message sent by the arrival notification module comprises one or more message types from the set consisting of:
   a Short Message Service (SMS) message, an Enhanced Messaging Service (EMS) message, a Multimedia Messaging Service (MMS) message, and an email message.

* * * * *